United States Patent

[11] 3,604,778

[72] Inventor Christoph B. Burckhardt
 Berkeley Heights, N.J.
[21] Appl. No. 868,485
[22] Filed Oct. 22, 1969
[45] Patented Sept. 14, 1971
[73] Assignee Bell Telephone Laboratories, Incorporated
 Murray Hill, Berkeley Heights, N.J.

[54] FOURIER TRANSFORM RECORDING WITH RANDOM PHASE SHIFTING
 9 Claims, 6 Drawing Figs.

[52] U.S. Cl..................................................... 350/3.5,
 96/27 H
[51] Int. Cl..................................................... G02b 27/00
[50] Field of Search............................................. 350/3.5;
 96/27 R, 27 E, 27 H; 346/107, 108, 45.2

[56] References Cited
 OTHER REFERENCES

Murata et al., Japanese Jour. of Applied Physics, Vol. 7, March 1968, pp. 301–302 (copy in 350/3.5)
Pennington, IBM Technical Disclosure Bulletin, Vol. 11, No. 3, Aug. 1968 pp. 322–323 (copy in 350/3.5)
Leith et al., Applied Optics, Vol. 7, No. 10, Oct. 1968 pp. 2085–2089 (copy in 350/3.5)

*Primary Examiner*—David Schonberg
*Assistant Examiner*—Ronald J. Stern
*Attorneys*—R. J. Guenther and Arthur J. Torsiglieri

ABSTRACT: In making a record of the exact Fourier transform of an array of beams of electromagnetic radiation, the phase of each of a substantial fraction of the beams is shifted by a constant amount before recording the transform.

FOURIER TRANSFORM RECORDING WITH RANDOM PHASE SHIFTING

BACKGROUND OF THE INVENTION

This concerns Fourier transform recording and in particular the recording of the Fourier transform of an array of beams of electromagnetic radiation.

As is well known, the Fourier transform of the amplitude and phase distribution of radiation at a first location in a beam of radiation is simply an amplitude and phase distribution at a different location in the beam that is a mathematical Fourier transform of the first distribution. Such a Fourier transform may be made in several ways. For example, with optical techniques, if the amplitude and phase distribution that is to be transformed is located in the front focal plane of a lens, then the Fourier transform of this distribution is formed in the rear focal plane, which is also called the Fourier transform plane. Alternatively, if the amplitude and phase distribution that is to be transformed is located in a converging light beam formed by a beam of parallel light that is incident on a converging lens, then the Fourier transform of this distribution multiplied by a spherical phase factor is formed in the focal plane of the converging lens. Further details about Fourier transforms and about optical Fourier transforms may be found in R. Bracewell's "The Fourier Transform and its Applications" (McGraw-Hill 1965); J. W. Goodman's "Introduction to Fourier Optics" (McGraw-Hill, 1968); and S. G. Lipson and H. Lipson's "Optical Physics" (Cambridge University Press, 1969).

A recently developed application of Fourier transform techniques has been their use in the formation of hologram memories. As is well known, a hologram is a record of the interference pattern produced by the interference of a coherent reference-beam with a phase-related information-bearing beam from am object. When a hologram is illuminated with one of the two beams used in forming it, the other beam is diffracted from it. In particular, when a hologram is illuminated with the reference-beam used in forming it, the information-bearing beam is reconstructed; and an image of the object that originally formed the information-beam can be detected. Typically, this image can be either real or virtual depending on how the reference beam illuminates the hologram.

These properties can be used to advantage in forming a hologram memory that is in essence a record of the interference between a reference-beam and a large array of minute information-bearing beams derived from an appropriate object. In one such hologram memory detailed by V. A. Vitols in his paper "Hologram Memory for Storing Digital Data" at page 1581 of the IBM TECHNICAL DISCLOSURE BULLETIN, Vol., 8, No. 11 Apr. 1966) and by F. M. Smits and L. E. Gallagher in their paper "Considerations for a Semipermanent Optical Memory" at page 1267 of the BELL SYSTEM TECHNICAL JOURNAL, Vol. 46, No. 6 (July-Aug., 1967), the information-bearing beams are typically formed by illuminating a mask-bearing regularly spaced index points or bit positions at which are selectively located indicia representing bits or units of digital data. Illustratively, the presence at an index point or bit position of an aperture in the otherwise opaque data mask signifies a "1" bit while the absence of such an aperture at a bit position signifies a "0" bit; and, consequently, illumination of the opaque mask produces an array of points of light or minute information-bearing beams at the apertures in the mask. Because the beam that illuminates the data mask is coherent and phase-related to the reference-beam, the information-bearing beams derived from the mask are likewise coherent and phase-related to the reference-beam; and the interference of these beams is recorded as a hologram on a suitable medium.

Because very little space is required on the recording medium to store a hologram of as many as several thousand bits of digital data, it is possible to store on different areas of the same recording medium different holograms of different groups or pages of digital data. One simply exposes one area of the recording medium to one data page, then substitutes another data page for the first, lines up an unexposed portion of the recording medium with the new data page and exposes that previously unexposed portion to the new page. The result of such a procedure is to form on the recording medium an array of holograms, each of which is a recording of a page of digital data.

To read the memory, one hologram at a time is illuminated with the reference-beam to reconstruct the original information-bearing beams in such a way that they form a real image comprised of an array of spots of light representative of the array of apertures in the opaque mask used to form the hologram. Appropriate readout devices such as an array of photodetectors are then used to sense the presence or absence of particular spots of light or information-bearing beams in the real image.

Such a system as that described above has several attractive features. A hologram inherently has optical properties similar to those of a lens. Hence separate lenses are not required to image the contents of the hologram memory onto the array of photodetectors. Second, because the resolution obtainable in a unity-magnification-imaging magnification-imaging situation is close to the maximum theoretical limits, each light spot that is imaged onto a photodetector is as small and as intense as possible. Lastly, the capacity and speed of the hologram memory system are quite high. In their article, Smits and Gallagher demonstrate that the capacity of the memory is in excess of 100-million bits if the data is stored in the form of approximately 10,000 holograms each containing approximately 10,000 bits of data. Moreover, the access time to any one hologram can be less than ten microseconds ($10\mu$sec.).

While the system described above is attractive, it is also desirable to make the system relatively insensitive to blemishes or dust on the hologram-recording medium so that a small blemish or dust particle on the hologram memory cannot obscure or change a bit of digital data. Clearly, this advantage can be achieved if the information about each information-bearing beam is stored throughout one hologram, rather than in a small area; and it can be shown that just such storage can be achieved by recording the information-bearing beams in the form of a hologram of the Fourier transform of the information-bearing beams. However, while it may be fairly easy to form optically the Fourier transform of a distribution of radiation, it is not always so easy to record a Fourier transform of an ordered array of light beams. Specifically, an ordered array of light beams such as those produced by the apertures of the data mask used in a hologram memory is described mathematically as having an amplitude and phase distribution that is comprised of an ordered array of sharp, high- amplitude peaks or spikes of constant phase; and the Fourier transform of such an amplitude and phase distribution is a second ordered array of sharp, high-amplitude and high-intensity peaks or spikes in which each spike in the first array contributes something to the amplitude and intensity of every one of the spikes in the second array. The enormous difference in intensity, however, between the light in the Fourier transform spikes and that in the surrounding regions may make it difficult, if not impossible, to record the Fourier transform in the linear region of response in the recording medium. And, consequently, in applications such as holography where a linear-recording response is desired in order to avoid distortions, some way must be found to distribute the Fourier transform light more evenly over the Fourier transform plane.

One method that has been proposed is that the hologram recording be made in some plane other than the exact Fourier transform plane. However, while such a recording technique can result in more even light distribution, the optical system that must be used with such a method is considerably more complicated and more expensive than the optical system that is used to form a hologram in the exact Fourier transform plane. Another method that has been proposed for attaining a more even light distribution in the Fourier transform plane is that the phase of the light beams incident on the Fourier transforming lens be shifted at random with respect to each other because it can be shown that if the phase of the light beams is so shifted then the amplitude distribution in the Fourier transform plane is indeed substantially uniform. However, unless the phase shift within each beam is a constant, there may result an inferior reconstruction of the original beams. And, indeed, the light level in particular reconstructed beams may even be reduced so low that the presence of the beam cannot be detected by the readout device. Obviously, where each beam represents a binary bit that forms part of a unit of information, it is not practical to run the risk of having bits altered by indiscriminate phase-shifting.

SUMMARY OF THE INVENTION

Accordingly, it is an object of this invention to improve the recording of Fourier transforms and in particular the recording of Fourier transforms of ordered arrays of beams of radiation.

And it is a further object of this invention to improve the recording of Fourier transforms in which phase-shifting is used to distribute the amplitude in the transform more evenly over the Fourier transform plane.

In an illustrative embodiment of my invention, these and other objects are achieved in recording the Fourier transform by shifting the phase of approximately one-half the beams of the array to be transformed by approximately 180° before the transform is completed. Thus, if the array of beams is an array of light beams emanating from the apertures in an otherwise opaque mask that is located in a converging light beam formed by a beam of parallel light incident on a converging lens, the phase of approximately one-half these light beams is shifted approximately 180° before the light is incident on the rear focal plane of the lens. Advantageously, this phase shift is effected by a second mask located next to the aperture mask.

BRIEF DESCRIPTION OF THE DRAWING

These and other elements, features and objects of my invention will be more readily understood from the following detailed description of the invention taken in conjunction with the following drawing in which.

DETAILED DESCRIPTION OF THE DRAWING

Figure 1:
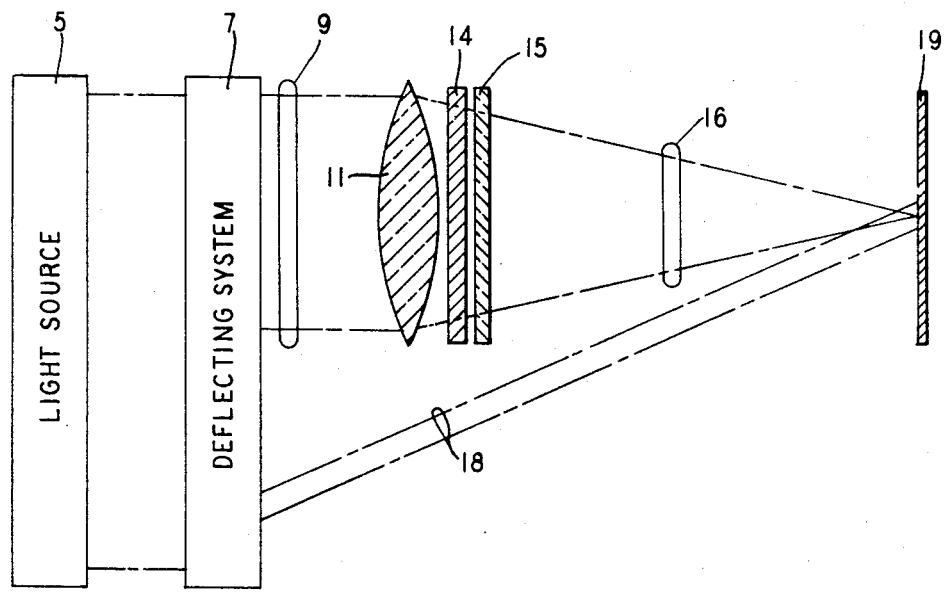
FIG. 1 shows an illustrative embodiment of my invention.

Shown in FIG. 1 is illustrative apparatus used in the practice of my invention. The apparatus is comprised of a light source 5, a deflecting system 7, a Fourier transforming lens 11, a data mask 14 that is comprised of an opaque medium in which there are small transparent apertures, a phase mask 15, and a photosensitive recording medium 19 that is located in the rear focal plane, which is also called the Fourier transform plane, of lens 11. Light source 5 is preferably a high-power laser such as the YAG: $Nd$ laser, frequency doubled to produce a watt of green light. Many other lasers are also available. Deflecting system 7 is typically a pair of cascaded acousto-optic light deflectors oriented to produce light deflection in two orthogonal directions and appropriate lens elements arranged to render parallel the different beam paths down which the light may be deflected. In addition, deflecting system 7 also contains the necessary optical elements, such as beam splitters and reflectors, to split the light from source 5 into two coherent light beams having a constant phase relation and to direct these two beams onto the same portion of recording medium 19 at an angle with respect to each other. Consequently, when the device of FIG. 1 is operated, an interference pattern is formed on a particular portion of recording medium 19, the precise portion depending on where the two beams were deflected the acousto-optic deflectors. Because light source 5 and deflecting system 7 are well known in the art, they are represented in FIG. 1 in block diagrams; and further discussion of them will be limited to an analysis of a representative illuminating beam 9 and reference-beam 18 produced by them.

Figure 2:
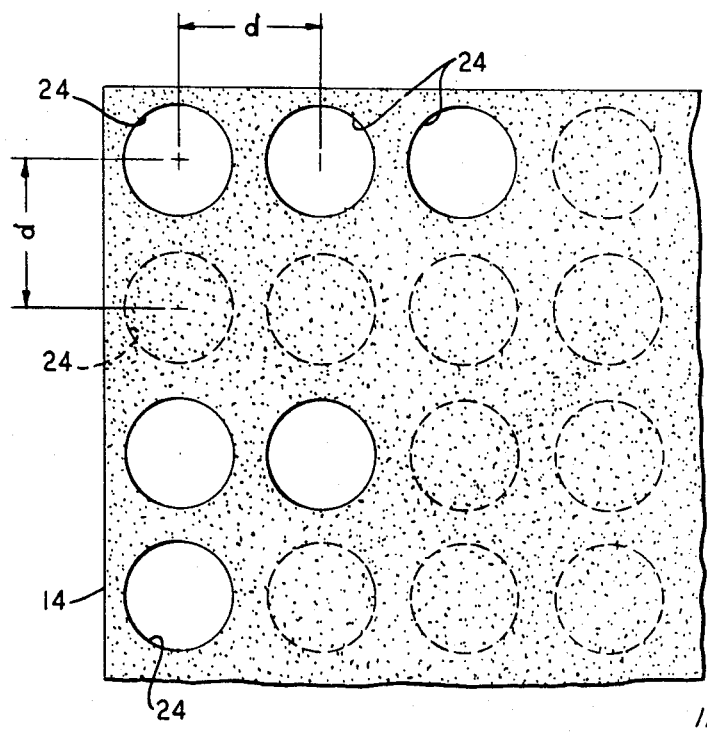
FIG. 2 shows a schematic view of the data mask used with the illustrative embodiment of my invention.

As described above and as shown in FIG. 2, data mask 14 bears an array of index points or bit positions 24 that are representative of digital data. Typically, these bit positions are arranged in a square array so that adjacent bit positions are equidistant, their centers being separated by a distance $d$. Illustratively, at those bit positions where a "1" bit is to be represented, there is a transparent aperture in mask 14 while at those bit positions where a "0" bit is to be represented there is no aperture. Thus, in the upper left-hand corner of the mask shown in FIG. 2 the first three bit positions in the first row are transparent, signifying "1" bits, while the first three bit positions in the second row are opaque, signifying "0" bits. There are numerous ways of representing the data on mask 14. As suggested above, data can be represented simply by holes in an otherwise opaque mask. Alternatively, more sophisticated mask systems using electrically switched Pockels or Kerr cells and polarizers can be used as described in U.S. Pat. No. 3,530,442, issued to R. J. Collier and L. H. Lin, and assigned to Bell Telephone Laboratories, Inc. The output of either representation of data is the same in that each provides an array of light beams from those positions on the mask registering one of the binary bits and no light beams from the positions registering the other binary bit.

Figure 3:
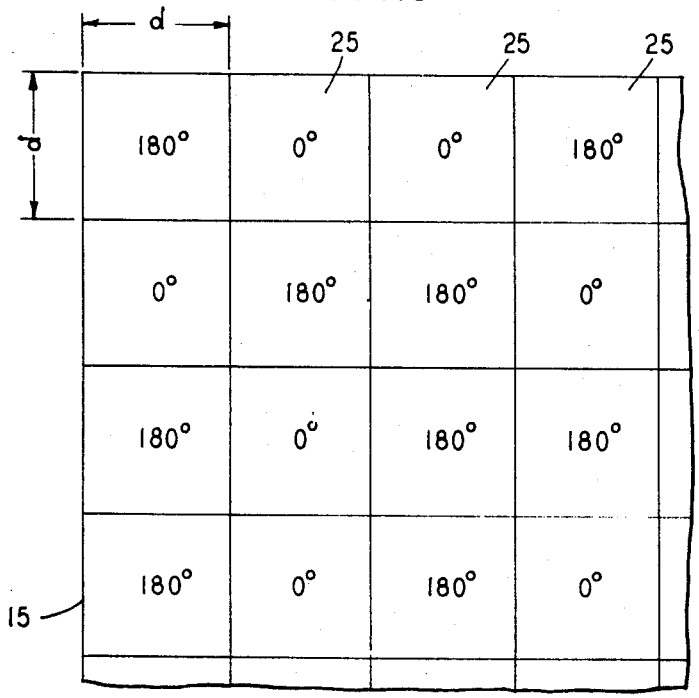
FIG. 3 shows a schematic view of the phase mask used with the illustrative embodiment of my invention.

As shown in FIG. 3, phase mask 15 is comprised of an array of transparent squares 25, the edges of which have a length $d$ that is the same as the spacing between the centers of the equidistant bit positions 24 of mask 14. As indicated by the designation 180° in some of the squares 25 of phase mask 15, some of the squares shift the phase of the light transmitted through them by 180° with respect to the phase of the light that goes through the squares labeled 0°. As will be detailed below, approximately 50 percent of the squares are fabricated to shift the phase of incident light by 180° and these squares are distributed randomly throughout phase mask 15.

Figure 4:
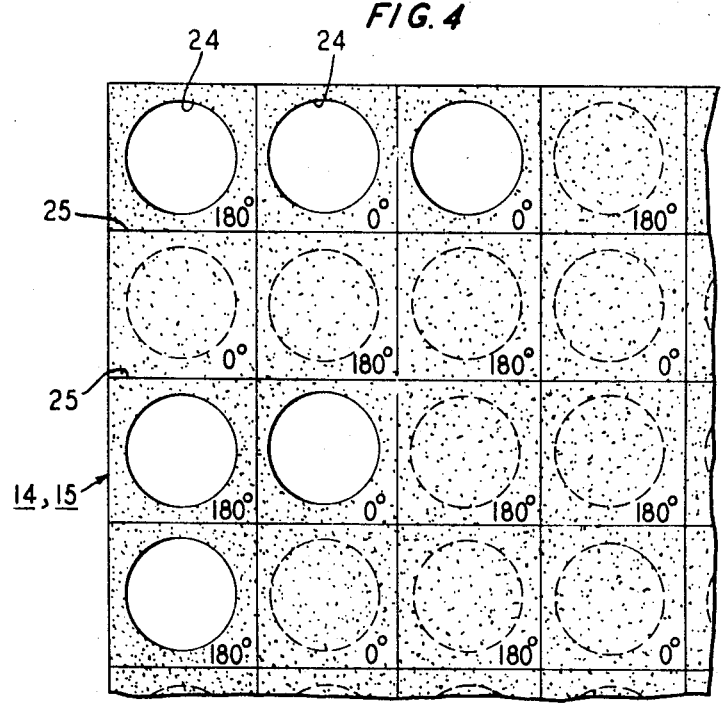
FIG. 4 shows a schematic view of the relation between the data mask and the phase mask in the illustrative embodiment of my invention.

In the apparatus of FIG. 1 data mask 14 and phase mask 15 are aligned so that light from each bet position 24 of data mask 14 goes through only one square 25 of phase mask 15, thereby establishing a one-to-one correspondence between the bit positions of mask 14 and the phase-shifting areas of mask 15. As shown in FIG. 4, the combination of the two masks then looks like a data mask where approximately half the bit positions have associated with them a phase of 0° and the remaining bit positions have a phase of 180°. Consequently, there is a probability of approximately one-half that a light beam from a bit position 24 will have its phase shifted by 180° by the particular square 25 of mask 15 through which it passes.

To record a Fourier transform hologram on a particular portion of recording medium 19, coherent light is directed from light source 5 to deflecting system 7 where it is deflected and formed into the illuminating beam 9 and the reference beam 18. Illuminating beam 9, which is preferably a beam of substantially parallel light such as would be derived from a source of light an infinite distance away, is then directed onto Fourier transforming lens 11 which focuses it through masks 14 and 15 onto the desired portion of recording medium 19 located in the rear focal plane, or Fourier transform plane, of lens 11. As indicated above, mask 14 represents an array of binary data in the form of the presence or absence of light transmitting apertures at an ordered array of index points or bit positions on the mask. Consequently, when mask 14 is illuminated by converging beam 9, an array of information-bearing light beams 16 is formed representative of the binary bits on mask 14. Because phase mask 15 is aligned with data mask 14 so that each light beam of the array transits only one of the phase-shifting squares of mask 15 and because the 180° phase-shifting squares are distributed randomly on the mask, the phase of approximately half the light beams from mask 14 is shifted by 180° with respect to the phase of the remaining light beams from mask 14.

Simultaneously, reference-beam 18 is directed onto the same portion of recording medium 19; and because beams 16 and 18 are coherent and have a constant phase relation, the two beams form an interference pattern that is recorded as a Fourier transform hologram on medium 19. This hologram is a record of both the bit positions on mask 14 that transmitted light and those that did not because a real image can be reconstructed from this hologram that is comprised of an array of spots of light that have a one-to-one correspondence with the light transmitting apertures of mask 14.

If desired, additional holograms may readily be recorded on other portions of recording medium 19. First, the data mask is changed to represent the data to be recorded and then the appropriate voltages are applied to the acousto-optic deflectors to deflect the interfering light beams to another portion of recording medium 19. If each data mask is simply an array of holes in an otherwise opaque medium, the masks may be changed by substituting one mask for the other; but care must be taken to ensure that the bit positions of the second mask are located in the same positions as the bit positions of the first mask. If, on the other hand, the data mask is an array of electrically switched Pockels or Kerr cells as in the aforementioned patent application of R. J. Collier and L. H. Lin, then there is no need to realign with every change of data in the mask because the position of such a data mask is not altered between hologram recordings.

Once the data has been changed and the appropriate voltages applied to the deflectors, light is directed from light source 5 to deflector system 7 where it is deflected and formed into an illuminating beam and a reference-beam. Again, the illuminating beam is directed through lens 11 to data mask 14 and phase mask 15 where it is formed into an array of information-bearing beams, approximately half of which have a phase that is approximately 180° different from the phase of the remaining beams. These beams then interfere with the reference-beam on the selected portion of recording medium 19, and the resulting interference pattern is likewise recorded as a hologram on medium 19.

To store a large number of holograms on one recording medium, it is desirable to record each hologram on only a very small area of the recording medium. Such an area may be defined simply by placing over the recording medium an opaque sheet in which there is one small transparent aperture. Such a mask limits the area of the recording medium that is exposed for each hologram to the area behind the aperture; and by moving the sheet and therefore the aperture between each hologram recording, different holograms can be stored on different areas of the recording medium. Alternatively, as detailed in the copending application of R. J. Collier and L. H. Lin, electronic shutters could be used or the recording medium could be a material such as a thermoplastic that can be made sensitive to light in only a limited region. As indicated above, by so limiting the area in which any one hologram is stored, it appears feasible to record over 10,000 holograms on one recording medium; and because it also appears likely that each hologram can record the presence or absence of over 10,000 light beams from the data mask, the total capacity of a recording medium is approximately $10^8$ bits.

Figure 5:
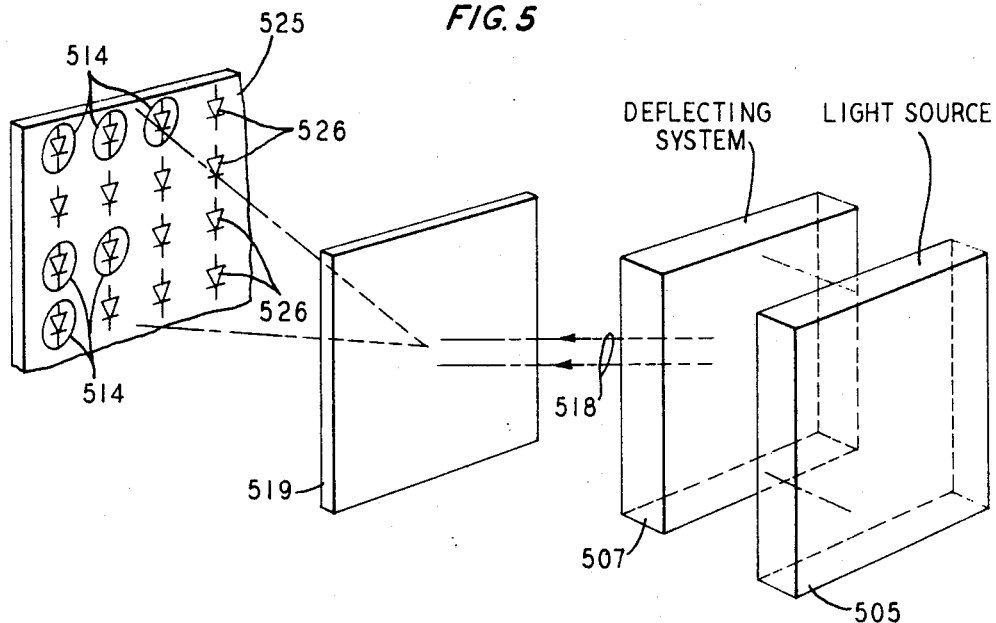
FIG. 5 shows illustrative apparatus used to reconstruct information from a hologram formed with the illustrative embodiment of my invention.

To read any one of the holograms stored on medium 19 in the process detailed above, illustrative apparatus such as that of FIG. 5 is used. This system is comprised of a light source 505, a deflecting system 507, the recording medium, here shown as element 519, and an array of photodetectors 525 located the same distance from recording medium 519 as the distance between data mask 14 and recording medium 19 in FIG. 1. Advantageously, light source 505 and deflecting system 507 are similar to light source 5 and deflecting system 7 used in FIG. 1 to record the holograms. In operating the apparatus to read a particular hologram, appropriate voltages are first applied to the deflectors of system 507 so as to deflect incident light at the hologram in a direction antiparallel to the direction of the reference-beam used in forming the hologram. After the deflectors are set, a reconstructing light beam 518 is then directed from light source 505 to deflecting system 507 where it is directed at the hologram on medium 519 that is to be read.

As is well known in holography, a beam that is antiparallel to the reference-beam is the conjugate of the reference-beam travelling in a direction opposite to that of the reference-beam. When such a beam is incident on a hologram, it projects from the hologram a beam of light that travels in a direction opposite to the direction of the information-bearing beam that formed the hologram and reconstructs a real image of the object that formed the information-bearing beam at the same distance from the hologram as the object was when the hologram was formed. Consequently, when an antiparallel reconstructing beam 518 is incident on the hologram on medium 519, at least some of it is diffracted by the hologram to reconstruct a real image 514 of the data mask that formed information-bearing beams 16 of FIG. 1. As indicated in FIG. 5, this image is, of course, an image of the pattern of light spots that was formed by illuminating data mask 14 with light beam 9 when the hologram was made; and it and photodetector array 525 are located the same distance from recording medium 519 as data mask 14 was when the hologram was made.

Array 525 is illustratively comprised of an array of light sensitive photodiodes 526 such as that described in the aforementioned article by Smits and Gallagher. The array is in the plane of image 514 and contains as many photodiodes as there can be spots of light in the image, one photodiode being lined up at each position where a spot of light can be formed. The presence or absence of a light spot at the photodiode can thus be transferred into an electric signal; and this signal can be stored, for example, in a flip-flop in a buffer memory.

In a similar fashion, any of the other holograms recorded on medium 519 can be read by a reconstructing beam that is antiparallel to the reference-beam used in forming the hologram. In each reconstruction, there is formed on the photodiode array a real image comprised of an array of light spots that is a copy of the binary information on the data mask used in forming the hologram. Because the bit positions on each data mask were similarly located, the bit positions in all the reconstructed images are coincident; and each image can therefore be read by one diode array, array 514. Again, if each hologram is recorded on only a small area of medium 519, it may be preferable to use a mask such as that used in recording the holograms to define the area of recording medium 519 that is illuminated by the reconstructing beam.

The effect of the random 180° phase shifting of the information-bearing beams has been analyzed mathematically in a fashion analogous to the analysis of the random telegraph wave at pages 326 and 327 of S. O. Rice's paper, "Mathematical Analysis of Random Noise," BELL SYSTEM TECHNICAL JOURNAL, Vol. 23, p. 282 July 1944). As a result of such analysis, it has been found that the intensity distribution in the Fourier transform plane of an array of light beams whose phase has been shifted in accordance with my invention is proportional to the intensity of the Fourier transform of one single light beam. Such a distribution is the well-known Airy pattern, and just such a pattern has been observed in practicing my invention.

The effect of inaccurate phase-shifts has also been investigated and has been found to create a pattern in which an array of sharp, high-intensity spikes are superimposed on the Airy pattern. A formula has been derived for determining how much power $P_s$ goes into the array of sharp, high-intensity spikes as a result of an inaccurate phase shift. Specifically, $$P_s = P \sin^2(\delta/2)$$

where P is the total power and δ is the deviation from an accurate phase shift of 180°. Thus, for δ=10°, $P_s$=0.76% of P; for δ=20°, $P_s$=3% of P; for δ=40°, $P_s$=11.7% of P; and for δ=50°, $P_s$=17.9% of P. Obviously, any phase shift transfers power from the ordered array of high-intensity spikes to the Airy pattern and a phase shift of 180° in half the light beams will transfer all the power to the Airy pattern. Complete transfer of power, while preferable, is not generally required; and to varying degrees other phase shifts are acceptable depending on the particular application of my invention. When my invention is used in recording Forier transform holograms of ordered arrays of light beams, a light intensity pattern is acceptable in which 10% of the power is in the ordered array of high-intensity spikes; and accordingly, the phase shift that is used can range between approximately 140° and 220°.

Similarly, it is not necessary to shift the phase of exactly one-half the light beams or to use a pattern that is completely random. Indeed, even in random patterns small regularities will appear. Again, the precise number of beams that must be phase-shifted and the degree of randomness required will vary depending on the intensity distribution desired in a particular application. For my purposes, it appears acceptable to shift the phase of approximately 40 percent to 60 percent of the light beams that are being Fourier transformed; and, consequently, the probability that a particular beam will be phase-shifted can range from two-fifths (0.40) to three-fifths (0.60) At the extremes, the percentage of beams that are phase shifted might range from about 33⅓ percent to about 66⅔ percent, and the probability of a beam being phase-shifted might range from about one-third to about two-thirds.

Phase mask 15 was fabricated quite easily using standard photoresist and etching techniques. With the aid of a random number generator, I first formed a pattern comprised of approximately equal numbers of opaque and transparent squares randomly interspersed. This pattern was then reduced photographically to the scale of the data mask and was used to etch glass according to a procedure detailed at pages 16 and 17 of Kodak publication P-91 "Applications Data for Kodak Photosensitive Resists." Briefly, glass slides coated with a 2,000 Angstrom thick layer of evaporated silver were covered with KTFR photo-resist, the pattern of opaque and transparent squares was contact printed on the photoresist, and the photoresist was developed.

The silver film in the unexposed areas was then etched away in concentrated Farmer's reducer with no agitation. The particular reducer solution used was 1 part of solution A, 4 parts of solution B and 10 parts of distilled water where solution A was composed of 37.5 grams of Potassium Ferricyanide in enough distilled water to make 500 cc. of solution and solution B was composed of 480 grams of Sodium Thiosulfate in enough distilled water to make 2,000 cc. of solution. Somewhat more than 30 minutes was needed to etch the silver film with the solution being changed every 15 minutes. For convenience, the etching was done in a transparent Petri dish placed on top of an illuminator so that the etching could be observed and terminated as soon as the silver under the unexposed areas of the photoresist was completely etched. Afterwards the back side of the glass slide was coated with paraffin, and the exposed glass was etched in a solution of 10 cc. of hydrofluoric acid (49 percent) and 200 cc. of distilled water. Next, the photoresist was wiped off with xylene, and the remaining silver film was etched off with diluted nitric acid. The phase-shift of the etched glass slide was then measured with a Mach-Zender type interferometer. By trial and error it was found that the time needed to etch glass to a depth corresponding to a 180° phase-shift at a wavelength of 6,328 Angstroms was 2 minutes.

Figure 6:
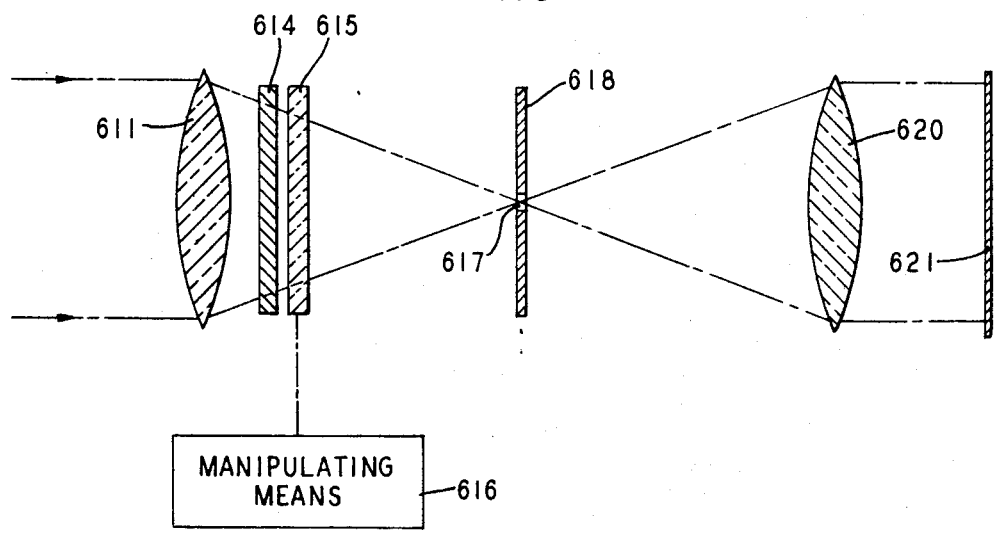
FIG. 6 shows illustrative apparatus for aligning the data mask and the phase mask.

As emphasized above, it is also necessary that the phase mask be aligned with the data mask so that light from each bit position on the data mask can pass through only one of the phase-shifting squares of the phase mask. This alignment is readily accomplished with the apparatus of FIG. 6. In this system there is shown a lens 611, a data mask 614, a phase mask 615 that is to be aligned with mask 614, manipulating means 616 for translating and rotating mask 615, an aperture 617 in an otherwise opaque medium 618 located in the focal plane or Fourier transform plane of lens 611, a second lens 620 positioned so that aperture 617 is in its front focal plane, and a screen 621. When lens 611 is illuminated by a beam of parallel light from an appropriate source, not shown, it converges the beam through data mask 614 and phase mask 615 to focus on aperture 617 in medium 618. The light that transits aperture 617 is then formed by lens 620 into an image of the data mask that can be observed on screen 621. Before alignment of the phase mask with the data mask, a pattern of data spots with reduced intensity can be observed in this image because any light from the data mask that is incident partly on a square with a 0° phase-shift and partly on a square with a 180° phase-shift is deflected away from aperture 617 and does not contribute to the formation of the image on screen 621. Thus, to align the two masks, I simply rotate and translate the phase mask with the manipulating means 616 until the image of data mask 614 on screen 621 is uniformly bright, indicating that the phase is constant over the area of every data spot and that the phase mask and the data mask are therefore aligned.

As is obvious from the foregoing, there are numerous ways to practice my invention and the preceding description is only meant to be illustrative of my invention. INn FIG. 1, any light source can be used that is capable of producing a light beam that is coherent enough to be used in forming a hologram. Other methods are available for forming the Fourier transform of a light beam such as the methods known in the art and described in U.S. Pat. No. 3,533,676, issued to L. H. Lin, Ser. No. and assigned to Bell Telephone Laboratories, Inc. Similarly, there are numerous ways of forming the data mask and of recording the hologram of the light beams from the data mask. Some of these methods have been detailed above, and there are others well known to those of ordinary skill in the art. In addition, there are alternative ways of arranging the phase mask with the data mask because it is only necessary that the phase mask be positioned so that the phase of incident light beams can be shifted a constant amount. For example, the phase mask could be positioned immediately in front of the data mask so that it is between the data mask and the Fourier transforming lens instead of behind the data mask as shown in FIG. 1. Other configurations are also possible if different optical systems are used.

As indicated above, my invention may also be practiced without using precisely phase-shifts shifts described above. Speaking generally, my invention is concerned with the imposition of a substantially constant phase-shift on a significant fraction of a group or array of beams of radiation that are being Fourier transformed. Only more narrowly is my invention concerned with the imposition of a phase-shift of approximately 180° at random on approximately half of an array of beams. And between theses methods of practicing my invention lie any number of compromises. As indicated above, a phase-shift of 170° instead of 180° produces little difference in the intensity distribution in the Fourier transform plane. And similarly, little effect is observed if the number of beams that are phase-shifted is not exactly 50 percent or if the pattern of phase-shifts is not purely random. Accordingly, it becomes difficult to define my invention precisely and one must resort to a definition in terms of the result achieved. Specifically, the phase of a large enough fraction of beams of radiation is shifted enough and with sufficient randomness to produce an intensity distribution in the Fourier transform plane that is sufficiently uniform for the intended use.

It is also possible to practice my invention with a phase mask 0 can produce more than one possible phase-shift. For example, a phase mask can be used in which approximately one-third of the phase-shifting squares shift the phase of an incident beam by approximately 120° and another third shift the phase by 240° or with a phase mask in which one-fourth shift the phase 90° another fourth 180° and another fourth 270°. And, in general, if (N−1) is the number of different nonzero phase-shift to be used, then the phase mask should provide a random array of an approximately equal number of phase-shifting squares for effecting phase-shifts of each multiple of $n$ 360°/$N$ from $n = 0$ to $n = (N−1)$. The details of fabrication of such a mask will be obvious from the description above of the fabrication of the mask of 0° and 180° phase-shifting squares.

My invention may also be practiced in other contexts than those described above. While the invention is presently being used for the recording of Fourier transform holograms of ordered arrays of light beams such as are formed by the data masks presently used in hologram memories, use of the invention is by no means so limited. Thus, if required, the invention could readily be used in forming Fourier transform holograms at frequencies of electromagnetic radiation that are substantially different from the frequencies of visible light; and specifically my invention could be used in acoustic holography which is practiced at radio frequencies. Of course, the phase mask that is used must be able to affect the phase of the electromagnetic radiation passing through it; and, as is well known, a glass phase mask would not be suitable at all frequencies of electromagnetic radiation. However, there generally are available equivalent means for producing phase shifts at different frequencies; and the fabrication and use of an appropriate phase mask for use at a particular frequency will be obvious to one skilled in the art.

It is also apparent that my invention is not limited to Fourier transform holography but can be practiced wherever a more uniform amplitude or intensity distribution is desired in the Fourier transform of an array of beams of electromagnetic radiation.

What is claimed is:

1. Apparatus for forming a record of the Fourier transform of an array of beams of electromagnetic radiation, comprising:
   means for forming an array of beams of electromagnetic radiation,
   means for shifting the phase of at least one-third of the beams in the array by an amount that is at least ninety degrees and is substantially constant across each beam, wherein the beams that are phase shifted are distributed approximately randomly throughout said array and
   means for recording the Fourier transform of the beams.

2. The apparatus of claim 1 wherein the probability that a particular beam is phase shifted ranges from approximately one-third to approximately two-thirds.

3. The apparatus of claim 1 wherein the amount of phase shift is the same for all the phase-shifted beams and ranges from approximately 140° to approximately 220° with respect to the beams that are not phase shifted.

4. The apparatus of claim 3 wherein:
   the probability that a particular beam is phase shifted ranges from approximately two-fifths to approximately three-fifths,
   the record of the Fourier transform is a Fourier transform hologram,
   the beams of electromagnetic radiation have a constant phase relation with a reference beam with which they interfere to form the hologram, and
   the beams of electromagnetic radiation are disposed in an ordered array.

5. The apparatus of claim 4 wherein the amount of phase shift is approximately 180° and the probability that a particular beam is phase shifted is approximately one-half.

6. The apparatus of claim 4 wherein the means for shifting the phase of the beams is a phase mask comprised of an ordered array of phase-shifting areas that have a one-to-one correspondence with the ordered array of beams of electromagnetic radiation.

7. The apparatus of claim 6 wherein the phase mask is a glass slide in which the phase-shifting areas have been etched.

8. The apparatus of claim 1 wherein:
   the phase shift in at least some of the phase-shifted beams is different from the phase shift in some of the other phase-shifted beams,
   the means for shifting the phase of the beams is a phase mask comprised of an array of phase-shifting areas that have a one-to-one correspondence with the array of beams of radiation, there being an approximately equal number of phase-shifting areas for each of the different phase shifts that are effected.

9. The apparatus of claim 8 wherein the number of different phase shifts is ($N−1$) and each of the different phase shifts that can be effected in the phase-shifted beams of radiation is one of the multiples of $n360/N$ where $n$ ranges from 1 to ($N−1$).